United States Patent [19]

Van Ewyk et al.

[11] Patent Number: 4,838,659
[45] Date of Patent: Jun. 13, 1989

[54] LIQUID CRYSTAL DISPLAYS AND FLUORESCENT DYES FOR USE THEREIN

[75] Inventors: Robert L. Van Ewyk, Wimborne; Ingrid M. O'Connor, London; Alan Mosley, Berkhamsted; Francis Jones, Leeds; Christopher Blackburn, Abingdon; John Griffiths, Leeds, all of England

[73] Assignee: The General Electric Company, p.l.c., England

[21] Appl. No.: 124,100

[22] PCT Filed: Mar. 20, 1987

[86] PCT No.: PCT/GB87/00196
§ 371 Date: Dec. 10, 1987
§ 102(e) Date: Dec. 10, 1987

[87] PCT Pub. No.: WO87/05617
PCT Pub. Date: Sep. 24, 1987

[30] Foreign Application Priority Data

Mar. 21, 1986 [GB] United Kingdom ............ 8607096

[51] Int. Cl.$^4$ .................. G02F 1/13; C09K 19/00; C07C 69/76
[52] U.S. Cl. .................... 350/337; 252/299.1; 428/1; 560/80; 350/349; 350/350 F
[58] Field of Search ........... 252/299.1; 350/337, 350/349, 350 F; 560/80, 84; 428/1

[56] References Cited

U.S. PATENT DOCUMENTS

| | | | |
|---|---|---|---|
| 4,337,999 | 6/1982 | Furada | 252/299.1 |
| 4,378,302 | 5/1983 | Aftergut et al. | 252/299.1 |
| 4,454,057 | 6/1984 | Kaneko et al. | 252/299.1 |
| 4,459,218 | 7/1984 | Yamada et al. | 252/299.1 |
| 4,492,648 | 1/1985 | Claussen | 252/299.1 |
| 4,555,355 | 11/1985 | Yamada et al. | 252/299.1 |
| 4,588,517 | 5/1986 | Kaneko et al. | 252/299.1 |
| 4,597,891 | 7/1986 | Rogers et al. | 252/299.1 |
| 4,607,097 | 8/1986 | Kano et al. | 252/299.1 |

FOREIGN PATENT DOCUMENTS

| | | | |
|---|---|---|---|
| 47027 | 3/1982 | European Pat. Off. | 252/299.1 |
| 0060895 | 9/1982 | European Pat. Off. | |
| 0068427 | 1/1983 | European Pat. Off. | |
| 0098522 | 1/1984 | European Pat. Off. | |
| 186970 | 7/1986 | European Pat. Off. | 252/299.1 |
| 3404116 | 8/1985 | Fed. Rep. of Germany | 252/299.62 |

Primary Examiner—Teddy S. Gron
Assistant Examiner—J. E. Thomas
Attorney, Agent, or Firm—Kirschstein, Ottinger, Israel & Schiffmiller

[57] ABSTRACT

Pleochroic fluorescent dyes of the general formula I:

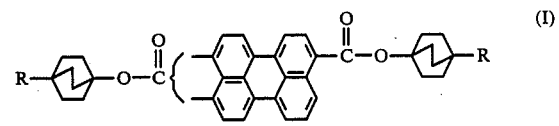

in which R is hydrogen or an aliphatic hydrocarbon radical containing not more than 20 carbon atoms and —CH$_2$— between carbon atoms or adjacent to the bicyclo[2.2]octane residue may be replaced by —O— may be dissolved in liquid crystal host material to form displays which are caused to fluoresce by incident low-energy ultraviolet initially absorbed by the liquid cyrstal host material and then internally transferred to the fluorophor. These dyes have greater stability to ultraviolet than other perylenedicarboxylic diesters while possessing good fluorescent properties and satisfactory order parameters. In formula I, R is preferably a straight or branched alkyl, and/or cycloalkyl group having 3 to 10 carbon atoms, preferably 5 to 7 carbon atoms. The liquid cyrstal host material preferably contains an energy-transfer agent such as a 4-substituted 4″-cyanoterphenyl. The 4-pentyl- and 4-propyl- bicyclo[2.2.2]oct-1-yl perylenedicarboxylates of Formula I and solutions of these dyes in nematic liquid crystal host "E7" (a mixture based on cyanobiphenyls containing 8% 4-pentyl-4″-cyanoterphenyl) are described in examples.

11 Claims, 1 Drawing Sheet

LIQUID CRYSTAL DISPLAYS AND FLUORESCENT DYES FOR USE THEREIN

BACKGROUND OF THE INVENTION

1. Field of the Invention

This invention relates to liquid crystal displays in which a pleochroic fluorescent dye is dissolved in a liquid crystal host material, the dye (fluorophor) being highly anisotropic in absorption and emission.

2. Description of Related Art

When such a dye is dissolved in a nematic host material, its "long" molecular axis is aligned with the director of the liquid crystal, and any orientation adopted by the liquid crystal can also align the dye molecules. Control of the dye emission and absorption can therefore be achieved by altering the alignment of the liquid crystal molecules by the application of an external electric field.

Fluorescence is a three-stage process initially involving the absorption of radiation at a specific wavelength, followed by relaxation to the lowest excited state, and ending with re-emission occurring at a longer wavelength. The whole process is very fast, typically 1-20 ns. In an anisotropic fluorophor, the emission and absorption dipoles are directionally related to the geometry of the dye molecule. Reorientation of the molecular axes with respect to the plane of polarization of the incident radiation results not only in a change in the absorption but also a corresponding change in the fluorescence.

Order parameters for absorption and fluorescence, defined in terms respectively of the optical densities and the fluorescence intensities resolved into parallel and perpendicular components with respect to the liquid crystal alignment, may be used to range fluorophors into an order of merit for display performance.

In a fluorescent display, the fluorescence may be stimulated by light absorbed directly by the fluorophor. For organic fluorophors this direct excitation results in a rather small difference in wavelength between the stimulating and the emitted radiation. Alternatively the fluorophor may be stimulated indirectly. In this case, the incident radiation, at a shorter wavelength, is absorbed by the liquid crystal host material and the stimulating energy is internally transferred to the fluorophor. There is then a large difference in wavelength between the stimulating and the emitted radiation. In a such display, where fluorescence results from energy transfer, the stimulating radiation may be low-energy ultraviolet (and hence invisible) which is absorbed strongly by the liquid crystal host material, while the fluorophor emits light in the visible part of the spectrum. This leads to a much more acceptable colour difference in the display.

Certain perylenedicarboxylic diesters are especially effective as pleochroic fluorescent dyes in this mode of indirect excitation. In particular, di(4-nonylphenyl) perylene-3,10-dicarboxylate and/or perylene-3,9-dicarboxylate has been described in GB No. 2169092A and in "Anisotropic fluorophors for liquid crystal displays" by R.L. Van Ewyk & al. *Displays*, October 1986, 155-160 as having excellent properties of fluorescence and order parameter. Both of these descriptions, published after the priority date of this application, are incorporated herein by way of reference.

It has now been found that displays containing the nonylphenyl diesters suffer from fading of the fluorescence after long exposure to ultraviolet and thus require uneconomically frequent replacement.

SUMMARY OF THE INVENTION

According to the invention novel di(bicyclo[2.2.2]oct-1-yl) perylene-3,9- and/or 3,10-dicarboxylates are provided having the general formula I:

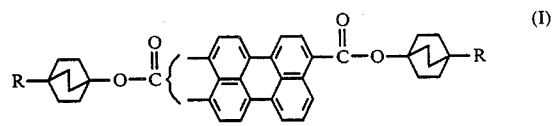

in which R is hydrogen or an aliphatic hydrocarbon radical containing not more than 20 carbon atoms and —$CH_2$— between carbon atoms or adjacent to the bicyclo[2.2.2]octane residue may be replaced by —O—.

In another aspect the invention provides a solution of pleochroic fluorescent dye in liquid crystal host material, characterized in that the dye is selected from the di(bicyclo[2.2.2]oct-1-yl) perylene-3,9- and/or 3,10-dicarboxylates of the general formula I.

In yet another aspect the invention provides a liquid crystal display in which a solution of pleochoric fluorescent dye dissolved in liquid crystal host material is arranged to be illuminated by low-energy ultraviolet of wavelength 300 to 380 nm, characterized in that the dye is selected from the di(bicyclo[2.2.2]oct-1-yl) perylene-3,9-and/or 3,10-dicarboxylates of the general formula I.

The dyes of formula I have been found to have much greater stability to ultraviolet than other perylenedicarboxylic diesters while possessing good fluorescent properties and satisfactory order parameters.

In formula I, R is preferably a saturated aliphatic radical containing 1 to 16 carbon atoms. In particular, R may be a straight or branched alkyl and/or cycloalkyl group having 3 to 10 carbon atoms, preferably 5 to 7 carbon atoms.

The dyes of formula I may be prepared by chemical analogy methods from perylene-3,9- and/or -3,10-dicarboxylic acid by conversion into the acyl chloride and reaction with the desired bicyclo[2.2.2]octan-1-ol. Satisfactory results are achieved by use of commercial perylenedicarboxylic acid in which both 3,9- and 3,10-isomers are present.

The liquid crystal host material may be of nematic, cholesteric or smectic type, and preferably contains an energy-transfer agent such as a 4-substituted 4''-cyanoterphenyl. It is conveniently a nematic liquid crystal host having positive dielectric anisotropy such as "E7", a mixture based on cyanobiphenyls supplied by BDH Chemicals Ltd, Poole, England, which contains 8% 4-pentyl-4''-cyanoterphenyl. A small amount of cholesteric material may be added to prevent reverse twist from occurring, for example 0.14% of "CB15" from BDH Chemicals Ltd.

For many purposes the amount of dye of formula I dissolved in the liquid crystal host is conveniently about 1%. Smaller or larger amounts may be used if desired, ranging from 0.1% to a saturated solution at room temperature.

A typical display construction is a laminated composite comprising the following elements illuminated by an ultraviolet source:

(a) filter, passing ultraviolet and cutting blue, adjacent to ultraviolet source;

(b) twisted nematic cell containing dye dissolved in liquid crystal host material;

(c) polarizer—parallel to long molecular axis of dye—at viewing surface of display.

The interaction of the anisotropic dye with incident radiation depends on the orientation of the dye molecules, and, because these are aligned with the director of the liquid crystal, this can be switched by application of an electric field across the liquid crystal host material. There is strong absorption of incident radiation and high fluorescence when the absorption dipole of the dye (positive fluorophor) is orthogonal to the direction of propagation of the stimulating radiation: there is weak absorption and weak fluorescence when the absorption dipole and direction of propagation are parallel.

BRIEF DESCRIPTION OF THE DRAWINGS

In the accompanying drawings.

DETAILED DESCRIPTION OF THE PREFERRED EMBODIMENTS

Figure 1:
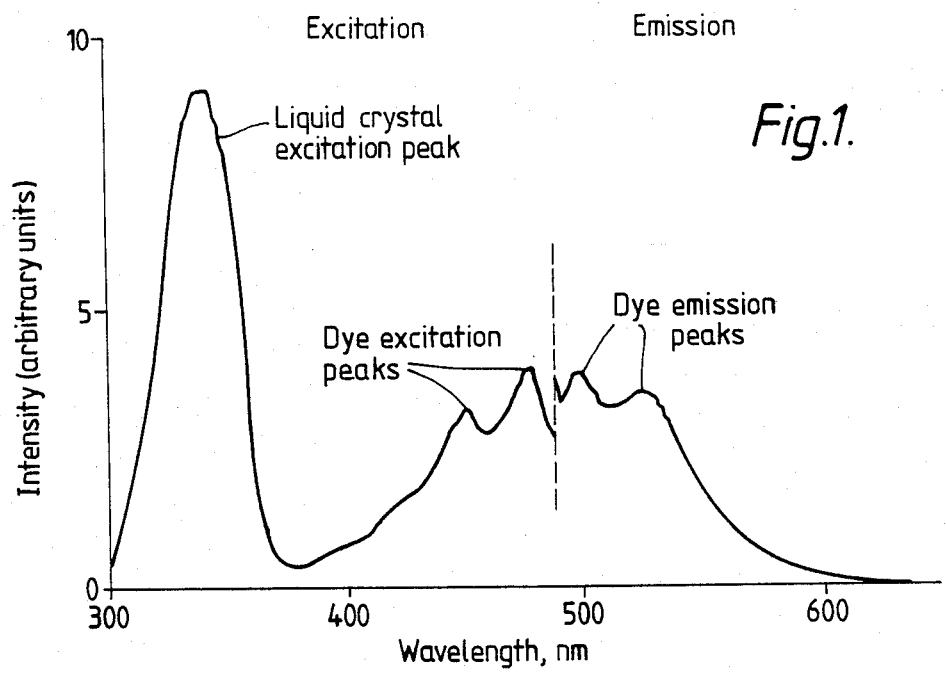
FIG. 1 is a graph showing the variation of intensity of light from a liquid crystal material against wavelength.

When energy transfer of incident ultraviolet radiation occurs between the liquid crystal host and the dye, the indirect excitation of the dye by radiation absorbed in the relatively large quantity of liquid crystal host material is much more efficient than direct excitation of the dye, as may be seen from FIG. 1 of the accompanying drawings.

The invention is illustrated by the following examples.

EXAMPLE 1

Preparation of mixed di(4-pentylbicyclo[2.2.2]oct-1-yl) perylene-3,9- and 3,10-dicarboxylates Mixed perylene-3,9- and 3,10-dicarboxylic acid (commercial material) (0.23 g, 0.68 mmol) was added to nitrobenzene (6 ml), and to the stirred suspension was added pyridine (4 drops) and thionyl choride (0.11 ml, 0.175 g, 1.5 mmol). The mixture was heated at 100° C. for 2 hours, and 4-pentylbicyclo[2.2.2]octan-1-ol (0.4 g, 2 mmol) was added. The temperature was raised to 110° C. and maintained for 5 hours. The reaction mixture was cooled to room temperature and ethanol (20 ml) was added to precipitate the diester. The crude diester was filtered off, dissolved in dichloromethane, and chromatographed over neutral alumina using dichloromethane as eluent. The main orange band was isolated and removal of the solvent under reduced pressure gave the desired diester (0.23 g; 49% yield based on perylenedicarboxylic acid). Further purification was achieved by recrystallization from xylene.

Microanalysis: Found: C, 82.05; H, 8.15%. $C_{48}H_{56}O_4$ requires C, 82.72; H, 8.10%.

At 1% in "E7" liquid crystal host material, the product had excitation and fluorescence maxima at 472 nm and 511 nm respectively.

EXAMPLE 2

In manner analogous to that described in Example 1, di(4-propylbicyclo[2.2.2]oct-1-yl) perylene-3,9- and 3,10-dicarboxylate was prepared using mixed perylene-3,9- and 3,10-dicarboxylic acid and 4-propylbicyclo[2.2.2]octan-1-ol as starting materials.

Microanalysis: Found: C, 81.9%; H, 7.3%. $C_{44}H_{48}O_4$ requires C, 82.5%; H, 7.5%.

At 1% in "E7" liquid crystal host material, the product had excitation and fluorescence maxima at 473 nm and 512 nm respectively.

Order parameters for absorption and fluorescence of the products of Examples 1 and 2 were obtained by the procedure described in *Displays*, October 1986, 155–160, using 1% solutions in "E7" liquid crystal host material at 21° C., and were similar to those of the nonylphenyl diester.

|  | Absorption | Fluorescence |
|---|---|---|
| Di(4-pentylbicyclo[2.2.2]oct-1-yl) perylene-3,9- and 3,10-dicarboxylate | 0.65 | 0.59 |
| Di(4-propylbicyclo[2.2.2]oct-1-yl) perylene-3,9- and 3,10-dicarboxylate | 0.69 | |
| Di(4-nonylphenyl) perylene-3,9- and 3,10-dicarboxylate | 0.69 | 0.60 |

The fading of the fluorescence of these three dyes on exposure to ultraviolet was compared. A solution of the dye in "E7" liquid crystal contained in an 8 μm parallel aligned cell was exposed at 30° C. to ultraviolet (peak emission 355 nm) from standard "black light" ultraviolet tubes. The ultraviolet light intensity was measured at the cells in each case and the data were normalized to a constant ultraviolet intensity of 6.8 mW/cm, it having previously been established that the logarithmic rate of fade was linearly proportional to the incident ultraviolet intensity. With this type of stimulation, fluorescence of the dyes at 511 nm, 512 nm and 528 nm respectively was excited via energy transfer from radiation absorbed by the liquid crystal at 339 nm. Intensity of fluorescence was measured at intervals during various periods of continuous exposure to ultraviolet and expressed as a percentage of its initial intensity. The results are given below and and are shown in FIG. 2 of the drawings.

Figure 2:
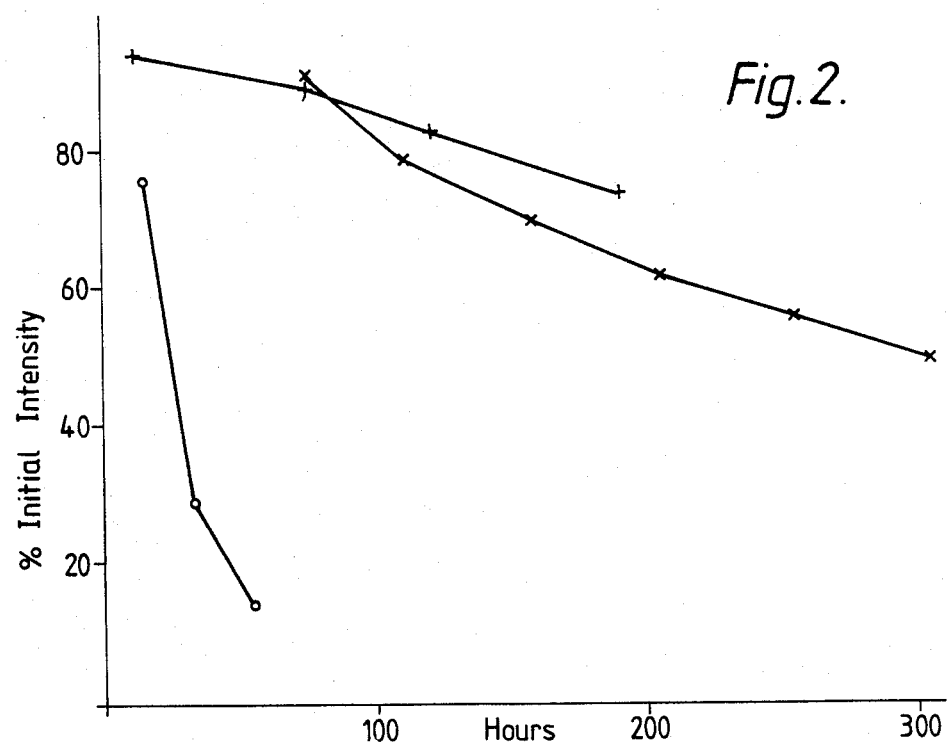
FIG. 2 shows curves of variation with time of the intensity of fluorescence from various materials in accordance with the invention.

Di(4-pentylbicyclo[2.2.2]oct-1-yl) perylene-3,9- and 3,10-dicarboxylate [-x- in FIG. 2]

| Exposure time (hours) | 75 | 110 | 158 | 206 | 254 | 304 |
|---|---|---|---|---|---|---|
| % Initial intensity | 91% | 79% | 70% | 62% | 56% | 50% |
| Fluorescence fade halflife | | | 304 hours | | | |

Di(4-propylbicyclo[2.2.2]oct-1-yl) perylene-3,9- and 3,10-dicarboxylate [-+- in FIG. 2]

| Exposure time (hours) | 12 | 75 | 120 | 190 |
|---|---|---|---|---|
| % Initial intensity | 94% | 89% | 83% | 76% |
| Fluorescence fade halflife | | 525 hours | | |

Di(4-nonylphenyl) perylene-3,9- and 3,10-dicarboxylate [-0- in FIG. 2]

| Exposure time (hours) | 15 | 33.5 | 56 |

| % Initial intensity | 76% | 29% | 14% |
| --- | --- | --- | --- |
| Fluorescence fade halflife | | 25 hours | |

I claim:

1. Esters selected from the class consisting of di(bicyclo[2.2.2]oct-1-yl)perylene-3,9-dicarboxylates and di(bicyclo[2.2.2]oct-1-yl)perylene-3,10-dicarboxylates of the general formula I:

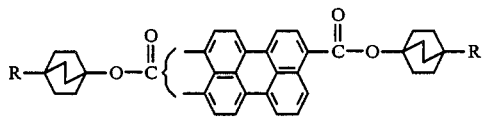

in which R is hydrogen or an aliphatic hydrocarbon radical containing not more than 20 carbon atoms and —CH$_2$— between carbon atoms or adjacent to the bicyclo[2.2.2]octane residue may be replaced by -0-.

2. Esters selected from the class comprising di(4-pentylbicyclo[2.2.2]oct-1-yl)perylene-3,9-dicarboxylate and di(4-pentylbicyclo[2.2.2]oct-1-yl)perylene-3,10-dicarboxylate.

3. Esters selected from the class comprising di(4-propylbicyclo[2.2.2]oct-1-yl)perylene-3,9-dicarboxylate and di(4-propylbicyclo[2.2.2]oct-1-yl)perylene-3,10-dicarboxylate.

4. Esters as claimed in claim 1 in which R is a saturated aliphatic radical of 1 to 16 carbon atoms.

5. Esters as claimed in claim 4 in which R is a straight or branched alkyl and/or cycloalkyl group having 3 to 10 carbon atoms.

6. Esters as claimed in claim 5 in which R has 5 to 7 carbon atoms.

7. A solution of pleochroic fluorescent dye in liquid crystal host material, characterized in that the dye is as claimed in claim 1.

8. A solution of pleochroic fluorescent dye in liquid crystal host material as claimed in claim 7, characterized in that the liquid crystal host material contains a 4-substituted 4''-cyanoterphenyl as energy-transfer agent.

9. A solution of pleochroic fluorescent dye in liquid crystal host material as claimed in claim 7, characterized in that the liquid crystal host material is a nematic liquid crystal host having positive dielectric anisotropy.

10. A solution as claimed in claim 9, wherein the liquid crystal host comprises a predominance of cyanobiphenyls.

11. A laminated composite construction for a liquid crystal display to operate under illumination by an ultraviolet source, said construction comprising (a) filter means adjacent said ultraviolet source for passing ultraviolet and cutting blue; (b) a twisted nematic liquid crystal cell containing a solution of dye as claimed in claim 7, the dye having a long molecular axis; and (c) polarizer means parallel to said long molecular axis of said dye at a viewing side of the display.

* * * * *